United States Patent [19]

Inoue

[11] Patent Number: 5,341,651
[45] Date of Patent: Aug. 30, 1994

[54] CONTROL APPARATUS FOR USE IN AUTOMOTIVE AIR CONDITIONING SYSTEM

[75] Inventor: Atsuo Inoue, Gunma, Japan

[73] Assignee: Sanden Corporation, Isesaki, Japan

[21] Appl. No.: 43,939

[22] Filed: Apr. 8, 1993

[51] Int. Cl.$^5$ .................. F25B 41/04; G05B 11/36
[52] U.S. Cl. ............................. 62/225; 62/228.5;
236/78 D; 318/609
[58] Field of Search ............ 236/78 D; 364/161–163;
318/609–610; 62/225, 228.5

[56] References Cited

U.S. PATENT DOCUMENTS

| 4,025,763 | 5/1977 | Kleiss | 318/610 X |
|---|---|---|---|
| 4,326,386 | 4/1982 | Tamura | 62/150 |
| 4,471,632 | 9/1984 | Nishi et al. | 62/208 |
| 4,510,764 | 4/1985 | Suzuki | 62/133 |
| 4,539,821 | 9/1985 | Tamura | 62/228.5 |
| 4,673,031 | 6/1987 | Wiemer | 236/78 D |
| 4,796,438 | 1/1989 | Sato | 62/133 |
| 5,187,942 | 2/1993 | Komatsu et al. | 62/149 |
| 5,189,886 | 3/1993 | Terauchi | 236/78 D X |

FOREIGN PATENT DOCUMENTS 58-43340  3/1983  Japan .

Primary Examiner—William E. Wayner
Attorney, Agent, or Firm—Baker & Botts

[57] ABSTRACT

The present invention is directed to a control apparatus for use in an automotive air conditioning system which includes a variable capacity-type refrigerant compressor. The automotive air conditioning system comprises a refrigerant circuit including a refrigerant compressor with an externally controlled, variable capacity control mechanism; an evaporator connected to a suction chamber of the compressor; and a control apparatus which controls refrigerant circuit operation. The control apparatus includes an adjusting device for adjusting a control point of the compressor suction chamber pressure. During operation of the automotive air conditioning system, the control point of the compressor suction chamber pressure is adjusted to effectively maintain the temperature of air immediately downstream from the evaporator at the set temperature. In one situation in which the automotive air conditioning system is operated in a static thermodynamic condition of the evaporator, the control point of the compressor suction chamber pressure is adjusted to effectively converge the temperature of air immediately downstream from the evaporator to the set temperature. In another situation in which the automotive air conditioning system is operated in a dynamic thermodynamic condition of the evaporator, the control point of the compressor suction chamber is also adjusted to effectively converge the temperature of air immediately downstream from the set temperature. Accordingly, the passenger compartment of the automobile can be more effectively air conditioned during operation of the automotive air conditioning system.

12 Claims, 4 Drawing Sheets

CONTROL APPARATUS FOR USE IN AUTOMOTIVE AIR CONDITIONING SYSTEM

BACKGROUND OF THE INVENTION

1. Field of the Invention

The present invention relates to an automotive air conditioning system. More particularly, it relates to a control apparatus for controlling operation of an automotive air conditioning system which includes an externally controlled, variable capacity-type refrigerant compressor.

2. Description of the Related Art

Control apparatus for controlling operation of an automotive air conditioning system, which include an externally controlled, variable capacity-type refrigerant compressor, are well known in the art. In prior art embodiment. The capacity of a refrigerant compressor is adjusted to control air temperature $T_e$ immediately downstream from an evaporator during operation of an automotive air conditioning system. $T_e$ is maintained at the set temperature $T_{set}$ by sending an electric signal having an amperage, which is determined by the proportional-plus-integral-plus-derivative control action (hereinafter "PID control action") of a conventional control apparatus, to an externally controlled, variable capacity control mechanism of the compressor.

In general, the operation of the automotive air conditioning system is divided into a first situation in which the automotive air conditioning system is operated in a static thermodynamic condition of the evaporator and a second situation in which the automotive air conditioning system is operated in a dynamic thermodynamic condition of the evaporator. In the first situation, heat load on the evaporator is slightly increased or decreased in response, for example, to the slight changes in the rotational speed of an evaporator fan caused by slight changes in electric load on the automobile's battery, or by slight changes in air temperature immediately upstream from the evaporator. On the other hand, in the second situation, heat load on evaporator is quickly increased or decreased by large amounts in response, for example, to changes in the rotational speed of the evaporator fan, e.g., changes in the amount of air flow which passes through an exterior surface of the evaporator, or a change in the automotive air conditioning mode, such as a switch from a passenger compartment air circulation mode to an outside air intake mode or vice versa.

In the conventional automotive air conditioning system described above, a coefficient of the PID control action of the control apparatus is fixed at one constant value during operation of the automotive air conditioning system. If, however, the coefficient of the PID control action of the control apparatus is selected at one constant value to effectively control the first situation of the operation of the automotive air conditioning system, the air temperature $T_e$ overshoots the set temperature $T_{set}$ by a significant amount. This amount is significant enough to lengthen the time period required for the air temperature $T_e$ to approach the set temperature $T_{set}$ in the second situation of the operation of the automotive air conditioning system. Such a delay is indicated by a dashed line in FIG. 4. On the other hand, if the coefficient of the PID control action of the control apparatus is selected at another constant value to effectively control the second situation of the operation of the automotive air conditioning system, the air temperature $T_e$ can not be maintained at the set temperature $T_{set}$, in the first situation of the operation of the automotive air conditioning system. This is due to the oversensitive control of the operation of the automotive air conditioning system.

SUMMARY OF THE INVENTION

Accordingly, it is an object of the present invention to provide an automotive air conditioning system which can adequately air condition a passenger compartment of an automobile.

The automotive air conditioning system of the present invention includes a refrigerant circuit having a refrigerant compressor with an externally controlled variable capacity control mechanism and an evaporator connected to a suction chamber of the refrigerant compressor. A fan is associated with the evaporator to move air through an exterior surface of the evaporator. A control mechanism controls operation of the refrigerate circuit.

The control mechanism includes the following devices. A sensing device senses a thermodynamic characteristic relating to the evaporator, such as the temperature of air immediately downstream from the evaporator. A first carrying out device carries out operation of a feedback control action, such as a PID control action. A second carrying out device, such as a gradient operation device, determines a thermal gradient of the air immediately downstream from the evaporator with respect to a time period. A storage device stores a relationship between the thermal gradient and a coefficient which subsequently is multiplied the result of the operation of the feedback control action of the first carrying out device. This multiplication is performed in a pressure adjusting device. A determining device determines a value of the coefficient by contrasting an operational result of the second carrying out device and the relationship stored in the storage device. The pressure adjusting device adjusts a control point of pressure in the suction chamber of the compressor according to the result of the operation of the feedback control action of the first carrying out device and the value of the coefficient determined by the determining device.

Other objects, advantages, and features will be apparent when the detailed description of the invention and the drawings are considered.

BRIEF DESCRIPTION OF THE DRAWINGS

In FIG. 4, except for the depiction of the change in the rotational speed of the evaporator fan, solid lines indicate the above changes in accordance with an embodiment of the present invention, and dashed lines indicate the above changes in accordance with a prior art embodiment.

DESCRIPTION OF A PREFERRED EMBODIMENT

Figure 1:
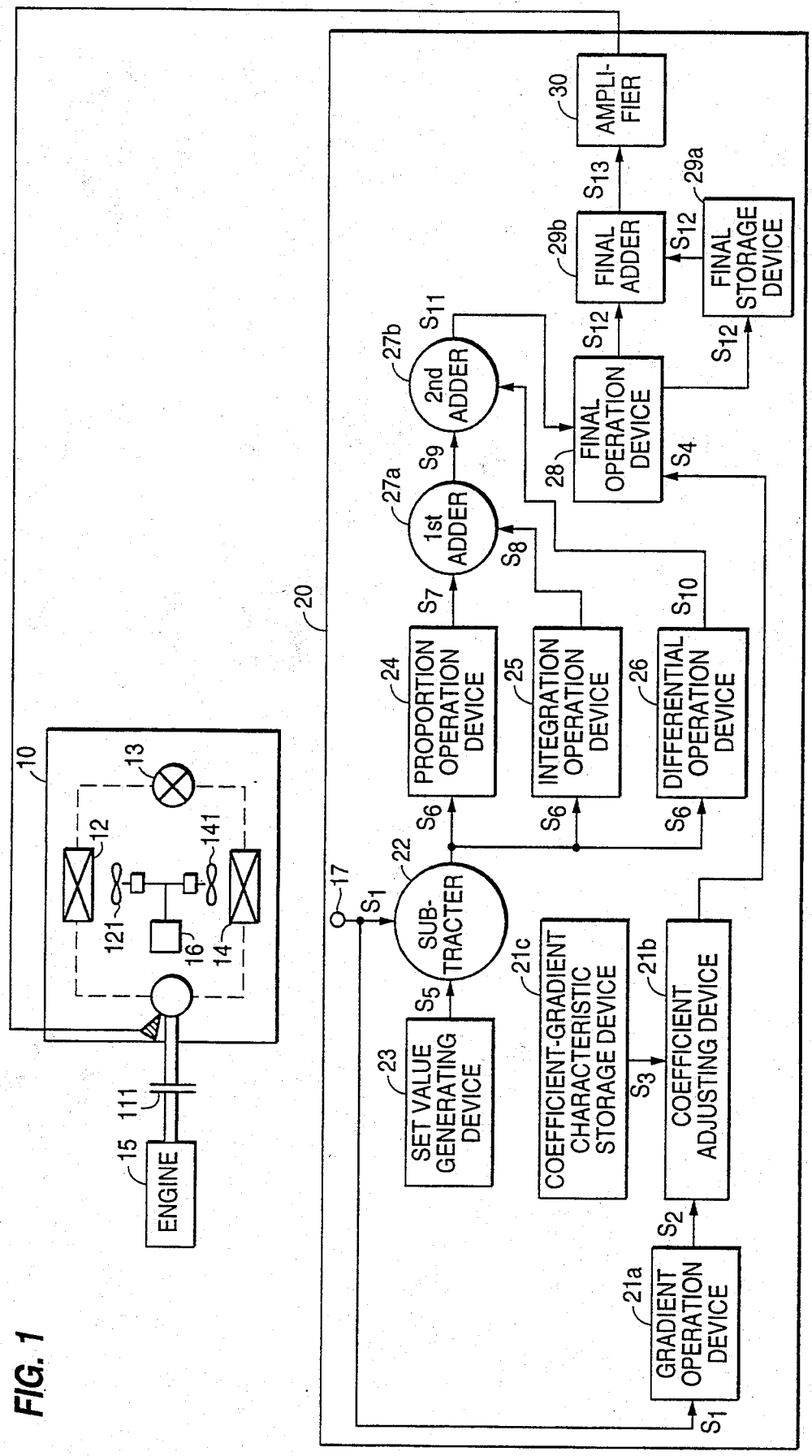
FIG. 1 illustrates a block diagram of an automotive air conditioning system in accordance with an embodiment of the present invention.

Referring to FIG. 1 the automotive air conditioning system includes refrigerant circuit 10 and control apparatus 20 which controls an operation of the automotive air conditioning system. Refrigerant circuit 10 includes refrigerant compressor 11 with an externally controlled, variable capacity control mechanism (not shown), condenser 12, expansion device 13, and evaporator 14, which are connected in series. Electromagnetic clutch 111 is fixedly mounted on compressor 11, and intermittently transmits power derived from an external power source, such as engine 15 of an automobile, to a drive shaft of compressor 10 in order to intermittently operate compressor 10. Refrigerant circuit 10 further includes condenser fan 121 which is associated with condenser 12 and passes air through an exterior surface of condenser 12 and evaporator fan 141 which is associated with evaporator 14 and passes air through an exterior surface of evaporator 14. Condenser fan 121 and evaporator tan 141 receive electric power from DC battery 16 installed in the engine compartment of the automobile.

Evaporator 14 is air-tightly disposed within a duct (not shown) the inlet of which is linked to the automobile passenger compartment and to the outside of the automobile through respective auxiliary ducts (not shown). The inlet of the duct is equipped with a damper (not shown). When air in the automobile passenger compartment and air outside the automobile are drawn into the inlet of the duct through the auxiliary ducts by the operation of evaporator tan 141, the air in the automobile passenger compartment and the air outside the automobile are mixed. Various mixture ratios are obtained by changing the pivotal position of the damper. The air mixed at the inlet of the duct passes through the exterior surface of evaporator 14 and flows into the automobile passenger compartment through an outlet of the duct.

Control apparatus 20 includes thermosensor 17, gradient operation device 21a, coefficient adjusting device 21b, coefficient-gradient characteristic storage device 21c, subtracter 22, set value generating device 23, proportion operation device 24, integration operation device 25, differential operation device 26, first adder 27a, second adder 27b, final operation device 28, final storage device 29a, final adder 29b, and amplifier 30. These elements are described in detail below. Further, subtracter 22, set value generating device 23, proportion operation device 24, integration operation device 25, differential operation device 26, first adder 27a, second adder 27b, final operation device 28, final storage device 29a, final adder 29b, and amplifier 30 form a PID control action apparatus.

Thermosensor 17, which is associated with evaporator 14, detects air temperature $T_c$ immediately downstream from evaporator 14 within a predetermined short time interval $\Delta t$, e.g., one second, and generates first electric signal $S_1$ representing the detected air temperature $T_c$. Thermosensor 17 is connected to gradient operation device 21a. Gradient operation device 21a processes first electric signal $S_1$ in accordance with the following equation:

$$\alpha_n = |\{(T_{e(n-3)} + T_{e(n-2)})/2 - (T_{e(n-1)} + T_{e(n)})/2\}/2 \cdot \Delta t| \quad (1)$$

In equation (1), the first term of the numerator is the mean value of the (n-3)th detected air temperature $T_{e(n-3)}$ and the (n-2)th detected air temperature $T_{e(n-2)}$, and the second term of numerator is the mean value of the (n-1)th detected air temperature $T_{e(n-1)}$ and the (n)th detected air temperature $T_{e(n)}$. Therefore, $\alpha_n$ represents a leveled thermal gradient of the detected air temperature $T_e$ with respect to a time period from the (n-3)th detecting time to the (n)th detecting time, i.e., a three second time period. Accordingly, in one operational situation of the automotive air conditioning system in which heat load on the evaporator 14 is slightly increased or decreased, i.e., when the detected air temperature $T_e$ rises or falls slightly, the thermal gradient $\alpha_n$ becomes a very small value. On the other hand, in another operational situation of the automotive air conditioning system in which the heat load on the evaporator 14 increases or decreases by a large amount, i.e., when the detected air temperature $T_e$ rises or falls by a large amount, the thermal gradient $\alpha_n$ becomes a very large value.

Figure 2:
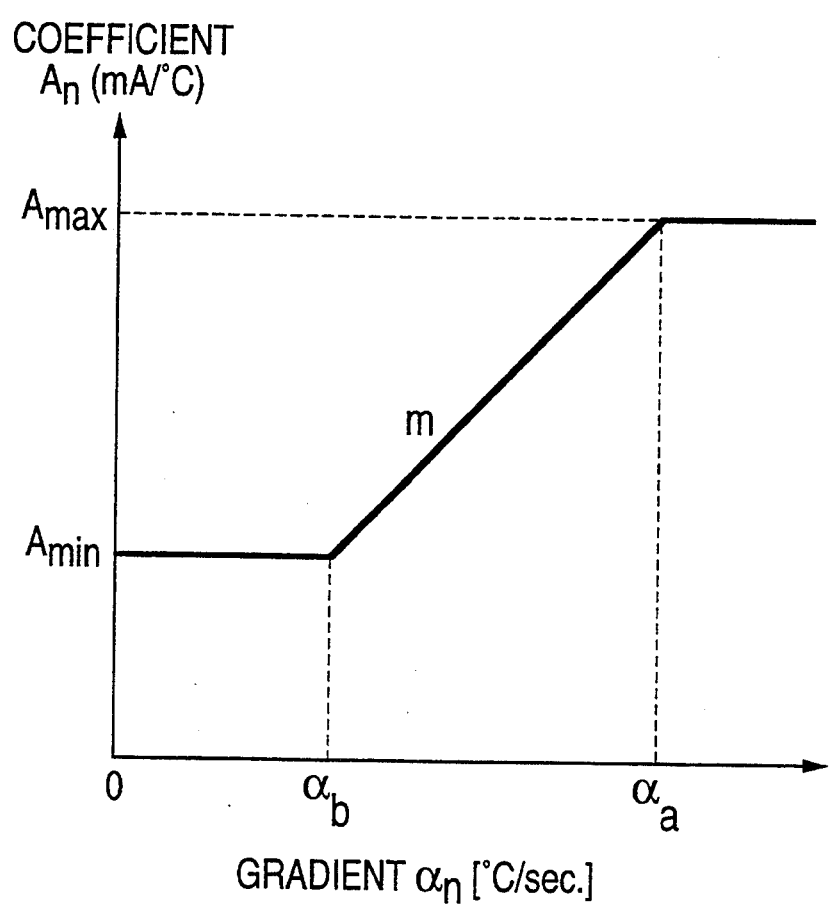
FIG. 2 is a graph depicting a relationship between a coefficient $A_n$ and a thermal gradient $\alpha_n$.

Gradient operation device 21a, which generates a second electric signal $S_2$ representing the thermal gradient $\alpha_n$, is connected to the coefficient adjusting device 21b. The coefficient adjusting device 21b is further connected to the coefficient-gradient characteristic storage device 21c which stores a coefficient-gradient characteristic as depicted in FIG. 2. The coefficient-gradient characteristic storage device 21c generates a third electric signal $S_3$ representing the coefficient-gradient characteristic as depicted in FIG. 2. Third electric signal $S_3$ is sent to coefficient adjusting device 21b from coefficient-gradient characteristic storage device 21c.

Referring again to FIG. 2, when the thermal gradient $\alpha_n$ is equal to or greater than a predetermined first boundary value $\alpha_a$, the coefficient $A_n$ is maintained at a predetermined maximum value $A_{max}$. When the thermal gradient $\alpha_n$ is equal to or less than a predetermined second boundary value $\alpha_b$, which is less than the predetermined first boundary value $\alpha_a$, the coefficient $A_n$ is maintained at a predetermined minimum value $A_{min}$. Further, when the thermal gradient $\alpha_n$ is less than the predetermined first boundary value $\alpha_a$, but greater than the predetermined second boundary value $\alpha_b$, coefficient $A_n$ varies within a range between the predetermined maximum and minimum values $A_{max}$ and $A_{min}$.

The coefficient adjusting device 21b processes second electric signal $S_2$ sent from gradient operation device 21a and third electric signal $S_3$ sent from the coefficient-gradient characteristic storage device 21c by adjusting the coefficient $A_n$ in accordance with the coefficient-gradient characteristic as depicted in FIG. 2. Thus, the coefficient adjusting device 21b adjusts the coefficient $A_n$ in accordance with the following conditions.

When $\alpha_n \geq \alpha_a$, the coefficient $A_n$ is adjusted such that:

$$A_n = A_{max}. \quad (2)$$

When $\alpha_b < \alpha_n < \alpha_a$, the coefficient $A_n$ is adjusted such that:

$$A_n = \{(A_{max} - A_{min})/(\alpha_a - \alpha_b)\}\alpha_n + \quad (3)$$

$$(A_{min} \cdot \alpha_a - A_{max} \cdot \alpha_b)/(\alpha_a - \alpha_b)$$

In equation (3), $\{(A_{max}-A_{min})/(\alpha_a-\alpha_b)\}$ is a slope of straight line m which is depicted in FIG. 2, and $(A_{min}\cdot\alpha_a-A_{max}\cdot\alpha_b)/(\alpha_a-\alpha_b)$ is an intercept at the ordinate with respect to straight line m.

When $\alpha_b \geq \alpha_n$, the coefficient $A_n$ is adjusted such that:

$$A_n = A_{min}$$

Accordingly, the coefficient $A_n$ varies in a range from $A_{max}$ to $A_{min}$ response to changes in the thermal gradient $\alpha_n$. Coefficient adjusting device 21b generates a fourth electric signal $S_4$ representing the coefficient $A_n$ as it varies in the range from $A_{max}$ to $A_{min}$ in response to changes in the thermal gradient $\alpha_n$. Coefficient adjusting device 21b is further connected to final operation device 28 to send fourth electric signal $S_4$ to final operation device 28. Further, when the ordinal number n is less than four, the thermal gradient $\alpha_n$ is adjusted, such that $\alpha_n$ is equal to $\alpha_b$ in gradient operation device 21a.

Subtracter 22, which is also connected to thermosensor 17, receives first electric signal $S_1$. Set value generating device 23 generates a fifth electric signal $S_5$ representing the set temperature $T_{set}$. Subtracter 22 processes first electric signal $S_1$ sent from thermosensor 17 and fifth electric signal $S_5$ sent from set value generating device 23 by subtracting the nth detected air temperature $T_{e(n)}$ from the set temperature $T_{set}$. This subtraction is shown by the following equation:

$$\Delta T_{v(n)} = T_{set} - T_{e(n)} \qquad (5)$$

In equation (5), the appended symbol n indicates the ordinal number of the detected air temperature $T_e$. Subtracter 22 generates a sixth electric signal $S_6$ representing the operational result of equation (5). Subtracter 22 is further connected to proportion operation device 24, integration operation device 25, and differential operation device 26.

Proportion operation device 24 processes sixth electric signal $S_6$ sent from subtracter 22 in accordance with the following equation:

$$p(\Delta T_{v(n)} - \Delta T_{v(n-1)}) \qquad (6)$$

In equation (6), p is an arbitrary coefficient and is selected to be p=1 in this embodiment. Accordingly, equation (6) is transformed to the following equation:

$$(\Delta T_{v(n)} - \Delta T_{v(n-1)}) \qquad (6)'$$

Proportion operation device 24 generates a seventh electric signal $S_7$ representing the operational result of equation (6)'. Proportion operation device 24 is connected to a first adder 27a.

Integration operation device 25 processes sixth electric signal $S_6$ sent from subtracter 22 in accordance with the following equation:

$$\Delta T_{v(n)} \cdot \Delta T / T_I \qquad (7)$$

In equation (7), $1/T_I$ is an arbitrary coefficient, and $\Delta T$ is a predetermined short time operation interval which is equal to $\Delta t$. Integration operation device 25 generates an eighth electric signal $S_s$ representing the operational result of equation (7). Integration operation device 25 is also connected to first adder 27a.

First adder 27a processes seventh electric signal $S_7$ sent from proportion operation device 24 and eighth electric signal $S_s$ sent from integration operation device 25 by adding the operational result of equation (6)' and the operational result of equation (7). First adder 27a generates a ninth electric signal $S_9$ representing the result of the addition performed therein. First adder 27a is connected to the second adder 27b.

Differential operation device 26 processes sixth electric signal $S_6$ sent from subtracter 22 in accordance with the following formula:

$$T_D(\Delta T_{v(n)} - 2\cdot\Delta T_{v(n-1)} + T_{v(n-2)})/\Delta T \qquad (8)$$

In equation (8), $T_D$ is an arbitrary coefficient. Differential operation device 26 generates a tenth electric signal $S_{10}$ representing the operational result of equation (8). Differential operation device 26 is also connected to second adder 27b.

Second adder 27b processes ninth electric signal $S_9$ sent from first adder 27a and tenth electric signal $S_{10}$ sent from differential operation device 26 by adding the result of the addition in first adder 27a and the operational result of equation (8). Accordingly, the result of the addition in second adder 27b is shown by the following equation:

$$\{(\Delta T_{v(n)} - \Delta T_{v(n-1)}) + \Delta T_{v(n)} \cdot \Delta T/T_I + \qquad (9)$$

$$T_D(\Delta T_{v(n)} - 2\cdot\Delta T_{v(n-1)} + \Delta T_{v(n-2)})/\Delta T\}$$

Second adder 27b generates an eleventh electric signal $S_{11}$ representing the operational result of equation (9), e.g., the feedback factor. Second adder 27b is further connected to final operation device 28 to send eleventh electric signal $S_{11}$ to final operation device 28.

Final operation device 28 processes eleventh electric signal $S_{11}$ sent from the second adder 27b and fourth electric signal $S_4$ sent from the coefficient adjusting device 21b by carrying out the following equation:

$$A_n\{(\Delta T_{v(n)} - \Delta T_{v(n-1)}) + \Delta T_{v(n)} \cdot \Delta T/T_I + \qquad (10)$$

$$T_D(\Delta T_{v(n)} - 2\cdot\Delta T_{v(n-1)} + \Delta T_{v(n-2)})/\Delta T\}$$

The operational result of equation (10) varies in response to changes in the value of the coefficient A. and the operational result of equation (9). Final operation device 28 generates a twelfth electric signal $S_{12}$ representing the operational result of equation (10). Final operation device 28 is further connected to final storage device 29a and final adder 29b to send twelfth electric signal $S_{12}$ to the final storage device 29a and final adder 29b.

Final storage device 29a stores two twelfth electric signals $S_{12}$ representing the (n-1)th and (n)th operational results of equation (10). Final adder 29b processes the twelfth electric signal $S_{12}$ representing the (n-1)th operational result of equation (10) sent from final storage device 29a, and the other twelfth electric signal $S_{12}$ representing the (n)th operational result of equation (10) sent from final operation device 28 by adding the (n-1)th operational result of equation (10) and the (n)th operational result of equation (10). Accordingly, the result of the addition in final adder 29b is shown by the following equation:

$$I_n = [A_{(n-1)}\{(\Delta T_{v(n-1)} - \Delta T_{v(n-2)}) + \Delta T_{v(n-1)} \cdot \Delta T/T_I +$$
$$T_D(\Delta T_{v(n-1)} - 2 \cdot \Delta T_{v(n-2)} + \Delta T_{v(n-3)})/\Delta T\}] +$$
$$[A_n\{(\Delta T_{v(n)} - \Delta T_{v(n-1)}) + \Delta T_{v(n)} \cdot \Delta T/T_I +$$
$$T_D(\Delta T_{v(n)} - 2 \cdot \Delta T_{v(n-1)} + \Delta T_{v(n-2)})/\Delta T\}] \quad (11)$$

As the operational result of equation (10) varies, so does the operational result of the right side of equation (11). Nevertheless, if the operational result of the right side equation (11) is equal to or less than a predetermined minimum value $I_{min}$, e.g., about 0 mA, the left side of equation (11) is adjusted, such that $I_n = I_{min}$. On the other hand, if the operational result of the right side of equation (11) is equal to or greater than a predetermined maximum value $I_{max}$, e.g., about 100 mA, the left side of equation (11) is adjusted, such that $I_n = I_{max}$. Final adder 29b generates a thirteenth electric signal the amperage of which is identical to the operational result of equation (11). Final adder 29b is further connected to amplifier 30 to send thirteenth electric signal $S_{13}$ amplifier 30. For example, amplifier 30 amplifies the amperage of thirteenth electric signal $S_{13}$ to $10 \cdot I_n$. The electric current having amperage $10 \cdot I_n$. is supplied from amplifier 30 to the solenoid of the externally controlled, variable capacity control mechanism of the compressor.

In this embodiment of the present invention, when the electric current supplied to the solenoid of the externally controlled, variable capacity control mechanism of the compressor increases, the pressure control point of the compressor suction chamber pressure increases to a greater value. When the electric current supplied to the solenoid of the externally controlled, variable capacity control mechanism of the compressor decreases, the pressure control point in the compressor suction chamber pressure also decreases to a smaller value.

Figure 3:
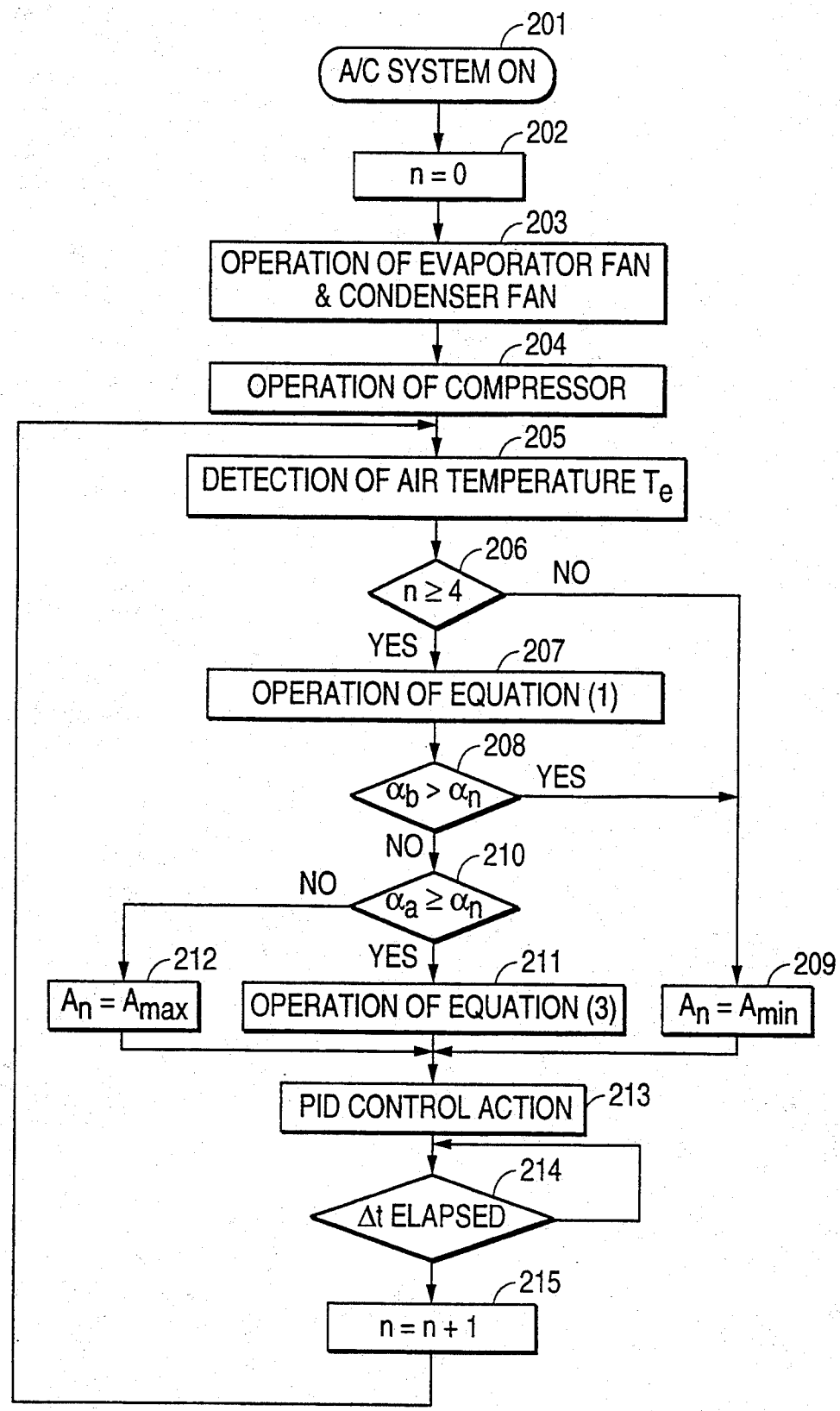
FIG. 3 is a flow chart illustrating operation of the automotive air conditioning system depicted in FIG. 1.

Operation of the automotive air conditioning system in accordance with this embodiment of the present invention is described below. Referring to FIG. 3, when it is desired to cool the passenger compartment of the automobile, the automotive air conditioning system is turned on as indicated in step 201. When the automotive air conditioning system is turned on, a counter (not shown) which counts the number of times that air temperature $T_e$ has been detected is reset to zero as indicated in step 202. Operation of condenser fan 121 and evaporator fan 141 is initiated in step 203, and concurrently, operation of control apparatus 20 is initiated.

As represented by step 204, when operation of control apparatus 20 is initiated, an electromagnetic coil (not shown) of electromagnetic clutch 111 is energized to initiate operation of compressor 11. When compressor 11 operates, compressed gaseous refrigerant flows to condenser 12 in which a first heat exchange operation occurs. Condensed refrigerant from condenser 12 then is expanded in expansion device 13 before evaporation occurs in evaporator 14. A second heat exchange operation also occurs in evaporator 14. Thereafter, vaporized refrigerant from evaporator 14 returns to compressor 11. As long as compressor 11 operates, the above-mentioned operations are repeated.

In step 205, thermosensor 17, which is associated with evaporator 14, detects air temperature $T_e$ immediately downstream from evaporator 14 within a predetermined short time interval $\Delta t$. Thermosensor 17 generates first electric signal $S_1$ representing the detected air temperature $T_e$. The first electric signal $S_1$ is sent from thermosensor 17 to subtracter 22 and gradient operation device 21a.

In step 206, it is determined whether the number of times that air temperature $T_e$ has been detected is equal to or greater than four, i.e., $n \geq 4$. If the number of times that air temperature $T_e$ has been detected is equal to or greater than four, i.e., $n \geq 4$, operation of the air conditioning system proceeds from step 206 to step 207. On the other hand, if the number of times that air temperature $T_e$ has been detected is less than four, i.e., $n < 4$, operation proceeds from step 206 to step 209. In step 207, operation of equation (1) is carried out in gradient operation device 21a.

Operational results in step 207 is classified by steps 208 and 210 as described below. In step 208, it is determined whether the thermal gradient $\alpha_n$ is equal to or less than $\alpha_b$. If $\alpha_n$ is equal to or less than $\alpha_b$, operation proceeds from step 208 to step 209. In step 209, the coefficient $A_n$ is adjusted, such that $A_n = A_{min}$, by coefficient adjusting device 21b. On the other hand, if $\alpha_n$ is greater than $\alpha_b$, operation proceeds from step 208 to step 210. In step 210, it is determined whether 60 $_n$ is less than $\alpha_a$. If $\alpha_n$ less than $\alpha_a$, operation proceeds from step 210 to step 211. In step 211, operation of equation (3) is carried out in coefficient adjusting device 21b. On the other hand, if $\alpha_n$ is equal to or greater than $\alpha_a$, operation proceeds from step 210 to step 212. In step 212, the coefficient $A_n$ is adjusted, such that $A_n = A_{max}$, by coefficient adjusting device 21b.

Step 213 follows steps 209, 211, and 212. In step 213, the amperage $I_n$ of thirteenth electric signal $S_{13}$ adjusted by the operational result of equation (11) is amplified at amplifier 30 to $10 \cdot I_n$. The electric current having amperage $10 \cdot I_n$ is supplied from amplifier 30 to the solenoid of the externally controlled, variable capacity control mechanism of the compressor to control the pressure control point in the compressor suction chamber.

Step 214 follows step 213. In step 214, it is determined whether the predetermined short time interval $\Delta t$ has elapsed from the time when the air temperature $T_{e(n)}$ was detected. When the predetermined short time interval $\Delta t$ has elapsed from the time when the air temperature $T_{e(n)}$ was detected, operation proceeds from step 214 to step 215. In step 215, the number of times that air temperature $T_e$ is detected increases to $n+1$. When the number of times that air temperature $T_e$ has been detected becomes $n+1$, operation returns from step 215 to step 205. The sequence of steps from step 205 to step 215 continues until operation of the automotive air conditioning system is terminated.

Figure 4:
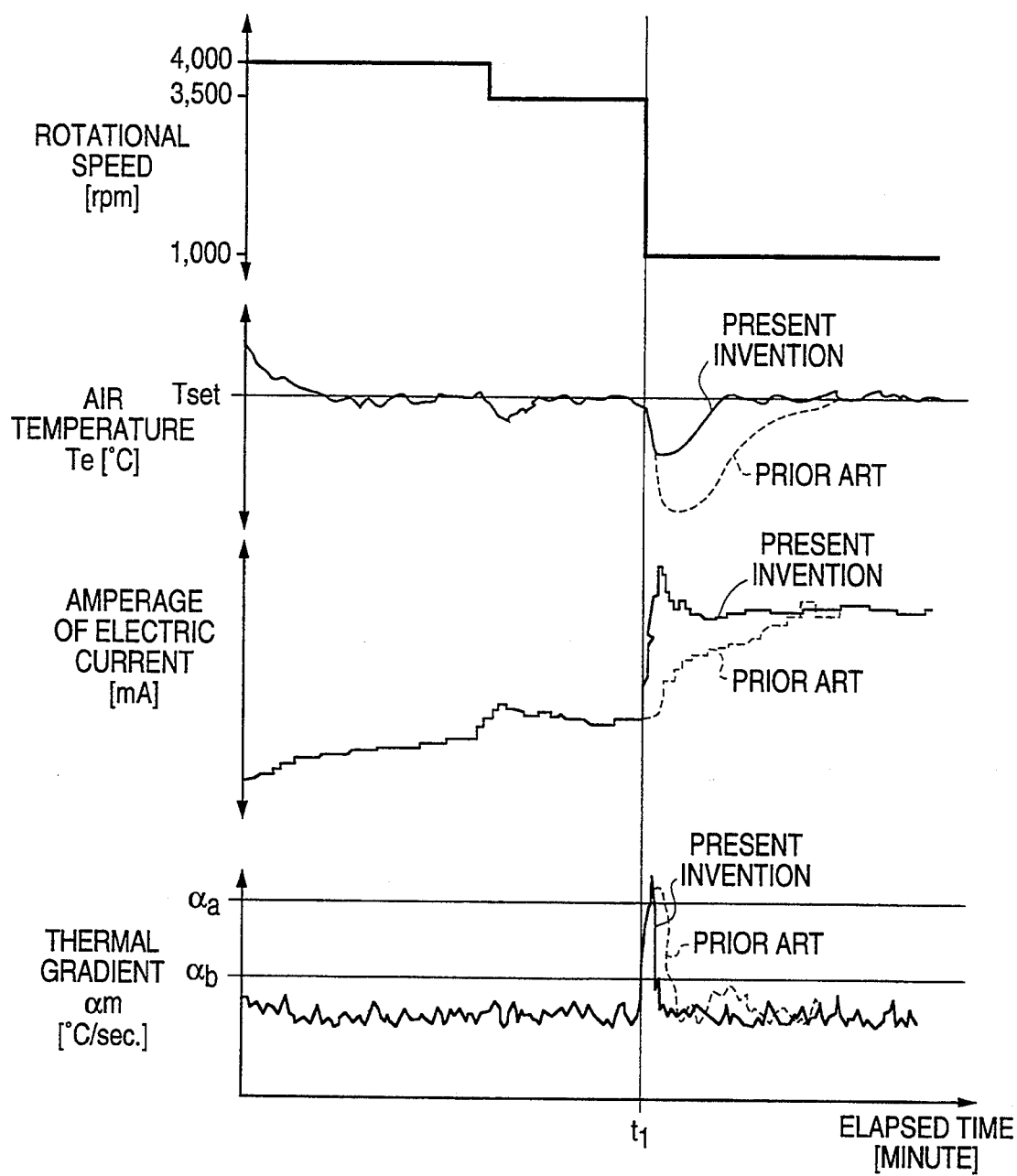
FIG. 4 is a composite graph depicting the relationships between a change in the rotational speed of an evaporator fan; a change in air temperature $T_e$ immediately downstream from the evaporator; a change in the amount of electric current supplied from an amplifier to a solenoid of an externally controlled, variable capacity control mechanism of the compressor; and a change in the thermal gradient $\alpha_n$ of the detected air temperature $T_{e(n)}$ during operation of the automotive air conditioning system.

FIG. 4 depicts a change in the rotational speed of evaporator fan 141; a change in the air temperature $T_e$ immediately downstream from evaporator 14; a change in the electric current supplied to the solenoid of the externally controlled, variable capacity control mechanism of the compressor; and a change in the thermal gradient $\alpha_n$ of the detected air temperature $T_{e(n)}$ during operation of the automotive air conditioning system. More specifically, in FIG. 4, except for the change in the rotational speed of evaporator fan 141, solid lines indicate the above changes in accordance with an embodiment of the present invention, and dashed lines indicate the above changes in accordance with a prior art embodiment.

Referring to FIG. 4, when the rotational speed of evaporator fan 141 is decreased quickly by a large amount, e,g., when the rotational speed of evaporator fan 141 is decreased from about 3500 rpm to about 1000 rpm, at a time $t_1$, the amount or air flow which passes through the exterior surface of the evaporator 14 also quickly decreases by a large value. Thus, heat load on the evaporator 14 is decreased by a large amount. As a result, air temperature $T_e$ immediately downstream from evaporator 14 is quickly reduced by a large amount, so that the thermal gradient $\alpha_n$ of the detected air temperature $T_{e(n)}$ increases to a large value. Thus, the thermal gradient $\alpha_n$ exceeds the predetermined first boundary value $\alpha_n$, as well as the predetermined second boundary value $\alpha_b$, immediately after time $t_1$.

In this situation, as long as thermal gradient $\alpha_n$ is greater than the predetermined second boundary value $\alpha_b$, but is less than the predetermined first boundary value $\alpha_a$, the coefficient $A_n$ is adjusted in the operational manner represented by step 211 of FIG. 3. As long as the thermal gradient $\alpha_n$ is equal to or greater than the predetermined first boundary value $\alpha_a$, the coefficient $A_n$ is adjusted in the operational manner represented by step 212 of FIG. 3, such that $A_n = A_{max}$. Accordingly, the value of the second term of the right side of equation (11) increases to a large value. In particular, the value of the second term of the right side of equation (11) continues to increase as long as the thermal gradient $\alpha_n$ is equal to or greater than the predetermined first boundary value $\alpha_a$. Therefore, amperage of the electric current supplied from amplifier 30 to the solenoid of the externally controlled, variable capacity control mechanism of the compressor is quickly increased by a large amount, so that the pressure control point in the compressor suction chamber pressure greatly increases immediately after time $t_1$. As a result, a fall in air temperature $T_e$ from the set temperature $T_{set}$ levels off at a low amount within a short time period. Once the fall in air temperature $T_e$ has leveled off, air temperature $T_e$ rises to approach the set temperature $T_{set}$ in accordance with the operational result of equation (11), so that $T_e$, converges on the set temperature $T_{set}$. When air temperature $T_e$ has converged at the set temperature $T_{set}$, air temperature $T_e$ is slightly increased or decreased in accordance with the operational manner of step 209 of FIG. 3.

As described above, even when the heat load on the evaporator 14 is decreased quickly by the large amount due to the a large and rapid decrease in the rotational speed of evaporator fan 141, the fall in air temperature $T_e$ from the set temperature $T_{set}$ levels off at a low amount within the short time period, so that air temperature $T_e$ quickly ceases to fall and begins to rise. Thus, $T_e$ effectively converges at the set temperature $T_{set}$. The air in the passenger compartment of the automobile, therefore, is adequately air conditioned even when the heat load on evaporator 14 is decreased quickly and by the large amount due to the large and rapid decrease in the rotational speed of evaporator fan 141.

The above embodiment is applied to an operational situation of the automotive air conditioning system in which the heat load on evaporator 14 is decreased quickly by the large amount due to the large and rapid decrease in the rotational speed of evaporator fan 141. Nevertheless, the present invention can be applied to any other operational situations of the automotive air conditioning system in which the heat load on the evaporator is decreased or increased quickly by a large amount due to a drastic change in the thermodynamic condition of the evaporator, such as in an operational situation of the automotive air conditioning system in which the heat load on the evaporator is increased quickly by the large amount due to a switch from a passenger compartment air circulation mode to an outside air intake mode.

Further, in the embodiment described above, air temperature $T_e$ immediately downstream from the evaporator is detected as a thermodynamic characteristic relating to the evaporator. Nevertheless, in the present invention, pressure in an outlet of the evaporator also may be detected as the thermodynamic characteristic relating to the evaporator.

Moreover, although the PID control action apparatus is used in the embodiment described above, the present invention is not restricted to this embodiment. In another embodiment of the present invention, for example, a proportional-plusintegral (PI) control action apparatus or a proportional (P) control action apparatus can be used in place of the PID control action apparatus.

This invention has been described in detail in connection with a preferred embodiment. It will be understood, however, by those skilled in the art that other variations and modifications can be easily made within the scope of this invention. Although a detailed description of the present invention is provided above, it is to be understood that the scope of the invention is not to be limited thereby, but is to be determined by the claims which follow.

I claim:

1. An automotive air conditioning system comprising:
   a refrigerant circuit having a refrigerant compressor with an externally controlled, variable capacity control mechanism and an evaporator connected to a suction chamber of said refrigerant compressor;
   means for moving air through an exterior surface of said evaporator; and
   a control mechanism for controlling said circuit, wherein said control mechanism comprises:
   means for sensing a thermodynamic characteristic relating to said evaporator;
   gradient determining means for determining a gradient of the thermodynamic characteristic over a time period;
   means for storing a relationship between said gradient and a coefficient;
   coefficient determining means for determining a value for said coefficient by using the result of said gradient determining means and the relationship stored in said storing means;
   feedback control means for monitoring the thermodynamic characteristic, comparing the thermodynamic characteristic to a set thermodynamic characteristic, and determining a feedback operational result for providing at least proportional control to said circuit; and
   pressure adjusting means for adjusting a control point of pressure in said suction chamber of said compressor responsive to said feedback operational result and said value of said coefficient determined by said coefficient determining means, whereby said feedback operational result is multiplied by said value.

2. The automotive air conditioning system of claim 1 wherein said feedback control means is a proportional control action device.

3. The automotive air conditioning system of claim 2 wherein the thermodynamic characteristic is pressure in an outlet of said evaporator.

4. The automotive air conditioning system of claim 1 wherein said feedback control means is a proportional-plus-integral control action device.

5. The automotive air conditioning system of claim 4 wherein the thermodynamic characteristic is pressure in an outlet of said evaporator.

6. The automotive air conditioning system of claim 1 wherein said feedback control means is a proportional-plus-integral-plus-derivative control action device.

7. The automotive air conditioning system of claim 6 wherein the thermodynamic characteristic is pressure in an outlet of said evaporator.

8. The automotive air conditioning system of claim 1 wherein said thermodynamic characteristic is a temperature of air measured immediately downstream from said evaporator.

9. An automotive air conditioning system comprising:
a refrigerant circuit having a refrigerant compressor with an externally controlled, variable capacity control mechanism and an evaporator connected to a suction chamber of said refrigerant compressor;
a fan for blowing air through an exterior surface of said evaporator; and
a control mechanism for controlling said circuit, wherein said control mechanism comprises:
thermometer for sensing a temperature of air immediately downstream from said evaporator;
gradient determining device for determining a thermal gradient of the temperature over a time period;
a storage device for storing a relationship between the gradient and a coefficient;
coefficient determining device for determining a value for the coefficient by using the result of the gradient determining device and the relationship stored in said storage device;
feedback control device for monitoring the temperature, comparing said temperature to a set temperature, and determining a feedback operational result for providing at least proportional control to said circuit; and
pressure adjusting device for adjusting a control point of pressure in said suction chamber of said compressor responsive to said feedback operational result and the value of the coefficient determined by said coefficient determining device, whereby said feedback operational result is multiplied by the value.

10. The automotive air conditioning system of claim 9 wherein said feedback control action device is a proportional control action device.

11. The automotive air conditioning system of claim 9 wherein said feedback control action device is a proportional-plus-integral control action device.

12. The automotive air conditioning system of claim 9 wherein said feedback control action device is a proportional-plus-integral-plus-derivative control action device.

* * * * *